June 3, 1947.  G. A. LYON  2,421,634
FENDER CONSTRUCTION
Filed Oct. 14, 1943
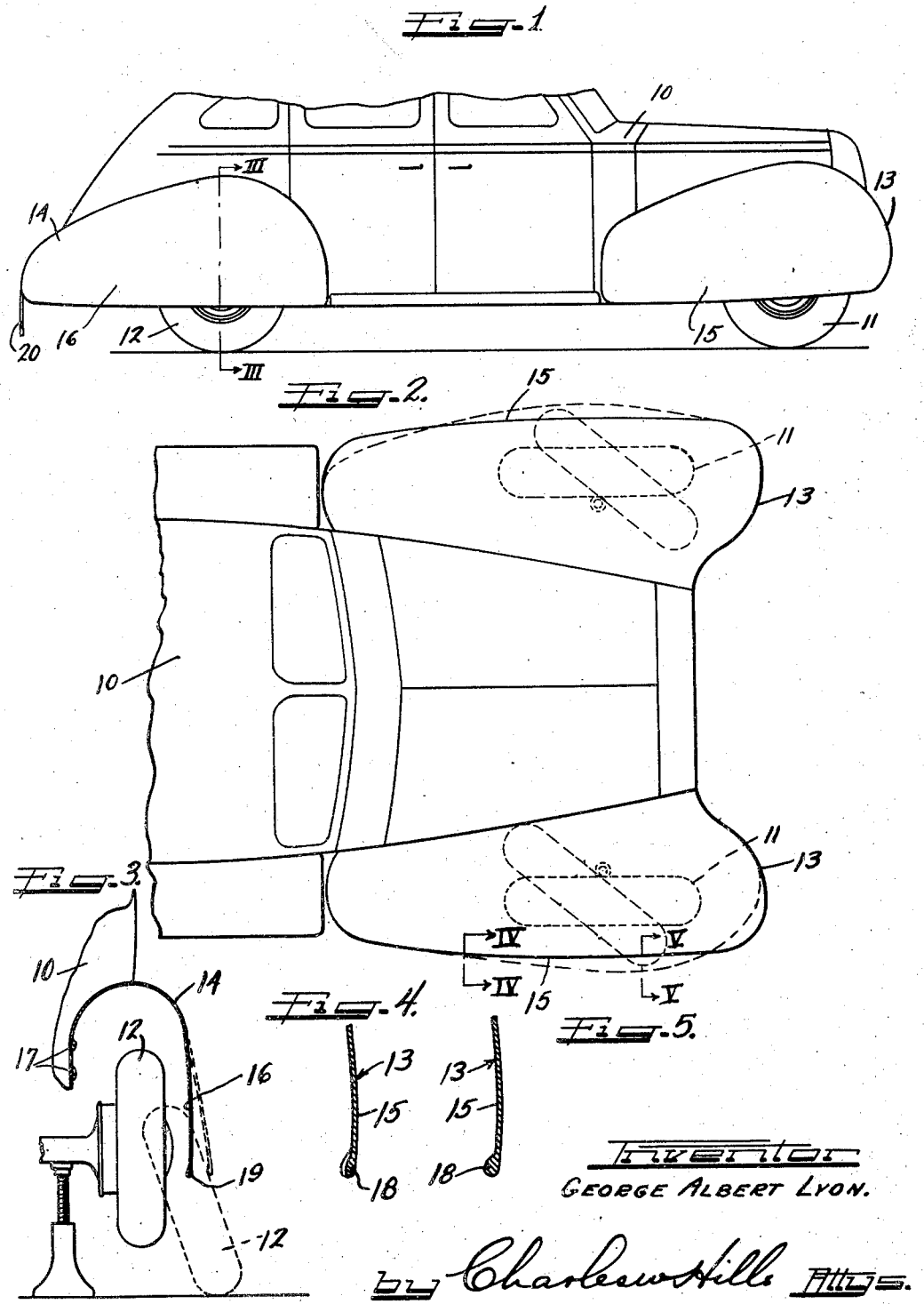
Inventor
GEORGE ALBERT LYON.
by Charles W. Hills Attys.

Patented June 3, 1947

2,421,634

UNITED STATES PATENT OFFICE 2,421,634

FENDER CONSTRUCTION

George Albert Lyon, Allenhurst, N. J.

Application October 14, 1943, Serial No. 506,171

5 Claims. (Cl. 280—153)

This invention relates to a fender construction for a vehicle wheel, and more particularly to a fender made of a plastic material.

An object of this invention is to provide an improved fender for a vehicle which may very closely hug the side of a wheel and which despite its proximity to the wheel permits of the manipulation of the wheel in use.

Another object of this invention is to provide a novel plastic fender for a vehicle.

A further object of this invention is to provide a combination unitary plastic fender and mud flap for a vehicle wheel.

Yet another object of this invention is to provide a fender for a pivotal wheel which is so closely disposed to the wheel as to require flexure of the fender by the wheel in the movement of the wheel.

Still another object of this invention is to provide a fender for a wheel which has a side skirt portion disposed in such close proximity to a side of the wheel that the wheel can not be removed below the lower edge of the skirt without a flexure of the skirt portion.

In accordance with the general features of this invention, there is provided an article of manufacture comprising a hollow wheel fender of resilient synthetic plastic material including a side portion for disposition over a side of the wheel and which extends at least to the center of the wheel and which is deflectable laterally by pressure thereagainst without permanent deformation.

In accordance with other features of this invention, there is provided in a vehicle including a pivotal wheel, a hollow fender for the wheel of plastic material and having a skirt portion extending downwardly substantially below the center of the wheel so as to cover a substantial part of the side of the wheel, and being arranged so close to the side of the wheel that the wheel contacts the same upon pivoting of the wheel and bulges the skirt portion laterally outwardly without permanent deformation of the same and whereby the skirt portion, upon the wheel resuming its normal position, automatically springs back to its normal position.

A further and additional feature of the invention relates to the provision in a vehicle including a wheel, of a hollow fender for the wheel of plastic material having a side skirt portion disposed in very close proximity to the side of the wheel and extending below the center of the wheel so that the wheel cannot be removed from below the lower edge of the skirt portion without the skirt portion being deflected by the pressure of the wheel thereon.

Yet another feature of the invention relates to the provision of hollow plastic fenders of the aforementioned characteristics with a reinforced edge such as will facilitate flexure of the fender and such as will aid in minimizing the amount of wear and tear imposed on the fender as a whole.

Other objects and features of this invention will more fully appear from the following detailed description taken in connection with the accompanying drawings which illustrate several embodiments thereof, and in which Figure 1 is a fragmentary side view of an automotive vehicle showing fenders thereon provided with the features of this invention;

Figure 2 is a fragmentary plan view of the front end of the vehicle shown in Figure 1 and illustrating how the pivotal or steering wheels of the vehicle are adapted to act upon the skirt portions of my novel fenders, the dotted outer lines showing the deflected positions of the skirt portions upon contacting of the same by the pivoted wheels;

Figure 3 is a fragmentary cross-sectional view taken on the line III—III of Figure 1 but with the structure in jacked position, showing in the dotted lines the manner in which a wheel may be removed by the flexing of the skirt portion of the plastic fender;

Figure 4 is a fragmentary cross-sectional view taken on the line IV—IV of Figure 2 showing the reinforced edge at one position on the edge of the fender; and Figure 5 is sectional view similar to Figure 4 taken on the line V—V of Figure 2 showing the condition of the edge at another point.

As shown on the drawings:

The reference character 10 designates generally a conventional type of automotive vehicle which may be streamlined in any desirable fashion. This vehicle is illustrated as being equipped with fenders of my invention, the front ones of which are designated generally by the reference character 13 and the rear ones of which are designated generally by the reference character 14. Inasmuch as the front fenders are the same except for the fact that one is a right-hand and the other a left-hand, a description of one is believed to suffice for both. The same also holds true in the case of the rear fenders 14. These fenders 13 and 14 are adapted to envelop the front and rear wheels 11 and 12 respectively.

It will be noted that in the case of both the front and rear fenders they extend down to at least the center of the wheels and, as shown, I preferably extend them even down beyond the center of the wheel. All fenders are of the so-called "crown" type, although it is to be understood that my invention is applicable thereto irrespective of the particular upper contours of the fenders.

The fenders of my invention are all constructed of a plastic material, such as a synthetic plastic, and excellent results may be had by making them of so-called ethyl cellulose although there are numerous other types of plastics on the market that are admirably adapted for this purpose. The type of plastic that is used must be resiliently flexible upon pressure, and yet must resist permanent deformation. In other words, after deflection of any portion of the fender, it must of its own accord, by reason of its inherent structural physical properties, return or spring back to its normal condition. Thus if the fender is slightly dented by reason of its contacting an object, the resiliency of the plastic resists permanent deformation and results in the dent being eliminated after contact by the material springing back to its original shape.

By reason of these advantageous physical and structural qualities of plastic fenders, I find that the skirt portions 15—15 of the front fenders may be disposed in much closer proximity to the front wheels 11—11 than has heretofore been feasible. The reason for this is that, as shown in Figure 2 by dotted lines, the pivoting of the front wheels 11 can be effected despite the proximity of the skirt portions 15—15 thereto, since such skirt portions will be bulged laterally outwardly as shown by dotted lines, by the contacting pressure of the wheels. It will be appreciated that in the operation of a vehicle, the front or steering wheels are not constantly being pivoted to the angle shown in Figure 2 during the normal operation of the vehicle. It is only when the vehicle is being turned sharply that the wheels are turned to such an angle as to necessitate flexure of the skirt portions 15—15 of the front fenders 13—13.

If, for example, as shown in Figure 2, the front wheels 11—11 are turned so as to make a right-hand turn, then the front edge of the right wheel contacts the forward part of the right-hand portion 15, and the rear edge of the left wheel contacts the more rearward part of the left-hand skirt portion 15. In either event, the contacting pressure results in a flexure of the skirt portions, and such flexure is possible by reason of the use of a resilient pliable plastic material in the fender itself.

In one case the fender might be bulged more at the front side, such as shown in the lower portion of Figure 2, whereas in the other case the bulge of the fender might be greater at the rear extremity of the fender. The essential concept, however, is that some portion of the skirt of the fender yields to an extent permitting of the movement of the wheel which would not be otherwise possible by reason of the close proximity of the side portion 15 to the side of the tire. Theoretically, however, the entire fender, since it is a unitary plastic device, is caused to respond to the distorting pressure which is transmitted through the major portion of the fender toward the body of the vehicle.

The fenders of my invention may be, of course, attached in any suitable manner to the sides of the vehicle, and for that purpose any of the usual fastening devices on the market may be employed. For example, rivets or bolts may be used for this purpose, as is illustrated in the case of the rear fender 14 shown in section in Figure 3. Such fastening elements are designated by the reference character 17. Similar fastening elements may be used for the front fenders.

The rear fender 14 does not have to flex in response to any movement of the rear wheel 12, but its skirt portion 16 must be flexible in order for the wheel to be removed from the fender upon the jacking of the rear axle upwardly in the manner well known in the art. I have illustrated in dotted lines in Figure 3 how the rear wheel can be removed by flexing outwardly or laterally the skirt portion 16 of the fender 14. The reason that such flexure of the skirt 16 is necessary in the case of the rear wheel is because the fender skirt extends downwardly to a point substantially at or below the center of the wheel.

All fenders of my invention may have their edges reinforced by means of beads 18 in the case of the front fenders, and beads 19 in the case of the rear fenders. Such beads may extend along the lower edge of the skirt portion and may be of a progressively changing dimension, as is shown in Figures 4 and 5, or may be discontinuous and in the form of bumps. That is, at one point in the edge the bead 18 may be of a lesser thickness than at another point, the maximum thickness being provided at the point of contact or where the greatest contact with the tire occurs. These beads not only reinforce the fenders but also, as noted before, serve as a means for reducing to a minimum the wear and tear on a tire by reason of frictional contact with the fender. Such beads may be formed integral with the body of the fenders or may constitute separate beads added to the edges of the fenders.

In Figure 1 I have illustrated the rear fenders as being equipped with what is called mud flaps 20. These flaps in reality constitute integral extensions of the rear edges of the fenders 14. Of course, by reason of the resilient flexible characteristics of the material used in the fender, a natural pivot is provided at the junction of the flap with the main body of the fender. Thus no additional fastening means is required for attaching a flap to a fender. Similar flaps may, if it is so desired, be used on the rear extremities of the front fenders 13.

The fenders of my invention may be molded, if it is so desired, or they may be pressed from sheet material, whichever operation may enable the securement of the necessary physical properties from the standpoint of the accomplishment of the objectives of my invention set forth hereinabove.

I claim as my invention:

1. In a vehicle including a pivotal wheel, a hollow fender for the wheel of plastic material, said fender having a skirt portion extending downwardly below the center of the wheel so as to cover a substantial part of the side of the wheel and being arranged so close to the side of the wheel that the wheel contacts the same upon pivoting of the wheel and deflects and bulges said skirt portion laterally outwardly, said skirt portion of its own accord springing back to its normal position after the wheel is moved out of contact therewith.

2. In a vehicle including a wheel, a hollow fender for the wheel of plastic material said fender having a skirt portion extending downwardly below the center of the wheel so as to cover a substantial portion of the side of the wheel and being arranged so close to the side of the wheel that said skirt is deflected by the wheel itself contacting the same when the wheel is in the process of being removed from out of the fender.

3. In a vehicle, including a wheel, a fender therefor of hollow, streamline form and being made of plastic material, said fender having an integral skirt portion extending downwardly below the center of the wheel so as to cover a substantial part of the side of the wheel, said skirt portion being arranged so close to the side of the wheel that the wheel cannot be removed from under the edge of the skirt, when in use on a vehicle, without the skirt being manually and temporarily deformed, said skirt portion having resiliency such that it springs back to its normal position upon being released from its deflected condition.

4. As an article of manufacture, a hollow fender for use with a pivotal vehicle wheel, said fender being made of synthetic resiliently flexible plastic material and having a skirt portion for covering a substantial part of a side of the wheel, said fender being of such transverse depth that said skirt portion will be so close to the side of the wheel that the wheel may contact the same upon pivoting of the wheel, said skirt portion also being transversely deflectable outwardly upon pressure thereagainst by the wheel, and springable back to its normal position after the pressure is relieved.

5. The vehicle combination of claim 1 further characterized by the skirt portion having projecting from its inner surface a reinforced area for contact by the wheel.

GEORGE ALBERT LYON.

REFERENCES CITED

The following references are of record in the file of this patent:

UNITED STATES PATENTS

| Number | Name | Date |
|---|---|---|
| 1,713,405 | Stansfeld | May 14, 1929 |
| 2,000,813 | Anchor | May 7, 1935 |
| 2,078,932 | Christman | May 4, 1937 |
| 2,116,915 | Telikamp | May 10, 1938 |
| 2,141,140 | Johnson | Dec. 20, 1938 |
| 2,313,587 | Saurer | Mar. 9, 1943 |
| 2,017,227 | Bernhart | Oct. 15, 1935 |
| 1,933,982 | Jackson | Nov. 7, 1933 |
| 2,031,219 | Koch | Feb. 18, 1936 |
| 1,807,435 | Merrilies | May 26, 1931 |
| 1,827,435 | Nastri | Oct. 13, 1931 |

FOREIGN PATENTS

| Number | Country | Date |
|---|---|---|
| 379,379 | Germany | Aug. 20, 1923 |